(12) United States Patent
Choi et al.

(10) Patent No.: US 10,892,477 B2
(45) Date of Patent: Jan. 12, 2021

(54) POROUS SILICON-SILICON OXIDE-CARBON COMPOSITE, AND METHOD OF PREPARING THE SAME

(71) Applicants: LG Chem, Ltd., Seoul (KR); Korea Advanced Institute Of Science And Technology, Daejeon (KR)

(72) Inventors: Seung Youn Choi, Daejeon (KR); Jang Wook Choi, Daejeon (KR); Eun Kyung Kim, Daejeon (KR); Yong Ju Lee, Daejeon (KR); Hye Jin Kim, Osan-si (KR)

(73) Assignees: LG Chem, Ltd.; Korea Advanced Institute Of Science And Technology

( * ) Notice: Subject to any disclaimer, the term of this patent is extended or adjusted under 35 U.S.C. 154(b) by 157 days.

(21) Appl. No.: 15/551,126

(22) PCT Filed: Mar. 30, 2016

(86) PCT No.: PCT/KR2016/003278
§ 371 (c)(1),
(2) Date: Aug. 15, 2017

(87) PCT Pub. No.: WO2016/159663
PCT Pub. Date: Oct. 6, 2016

(65) Prior Publication Data
US 2018/0166685 A1  Jun. 14, 2018

(30) Foreign Application Priority Data

Mar. 31, 2015  (KR) ........................ 10-2015-0045280

(51) Int. Cl.
*H01M 4/36* (2006.01)
*C01B 32/05* (2017.01)
(Continued)

(52) U.S. Cl.
CPC ............. *H01M 4/364* (2013.01); *B82Y 40/00* (2013.01); *C01B 32/05* (2017.08); *C01B 33/126* (2013.01);
(Continued)

(58) Field of Classification Search
CPC .... H01M 4/364; H01M 4/0471; H01M 4/133; H01M 4/1393; H01M 4/386; H01M 4/483; H01M 4/587; H01M 10/0525
See application file for complete search history.

(56) References Cited

U.S. PATENT DOCUMENTS

| 8,309,252 B2 | 11/2012 | Kim et al. |
| 2007/0254102 A1 | 11/2007 | Fukuoka et al. |

(Continued)

FOREIGN PATENT DOCUMENTS

| CN | 103515583 A | 1/2014 |
| CN | 103996837 A | 8/2014 |

(Continued)

OTHER PUBLICATIONS

Search report from International Application No. PCT/KR2016/003278, dated Jun. 27, 2016.

(Continued)

*Primary Examiner* — Jimmy Vo
(74) *Attorney, Agent, or Firm* — Lerner, David, Littenberg, Krumholz & Mentlik, LLP

(57) ABSTRACT

The present invention relates to a porous silicon-silicon oxide-carbon composite comprising a silicon oxide-carbon structure and silicon particles, wherein the silicon oxide-carbon structure comprises a plurality of micropores, and the silicon particles are uniformly distributed in the silicon oxide-carbon structure. The porous silicon-silicon oxide-carbon composite of the present invention shows decreased volume expansion due to the intercalation of lithium ions (Continued)

and improved electric conductivity, and has a porous structure. Accordingly, an electrolyte easily penetrates into the porous structure, and output properties may be improved. When the composite is included in a negative electrode active material, the performance of a lithium secondary battery may be further improved.

19 Claims, 5 Drawing Sheets

(51) Int. Cl.
*H01M 4/1393* (2010.01)
*H01M 4/04* (2006.01)
*B82Y 40/00* (2011.01)
*H01M 4/133* (2010.01)
*C01B 33/12* (2006.01)
*H01M 4/38* (2006.01)
*H01M 4/48* (2010.01)
*H01M 4/587* (2010.01)
*H01M 10/0525* (2010.01)
*B82Y 30/00* (2011.01)
*H01M 4/02* (2006.01)

(52) U.S. Cl.
CPC ......... *H01M 4/0471* (2013.01); *H01M 4/133* (2013.01); *H01M 4/1393* (2013.01); *H01M 4/386* (2013.01); *H01M 4/483* (2013.01); *H01M 4/587* (2013.01); *H01M 10/0525* (2013.01); *B82Y 30/00* (2013.01); *C01P 2006/12* (2013.01); *H01M 2004/027* (2013.01); *Y02P 70/50* (2015.11)

(56) References Cited

U.S. PATENT DOCUMENTS

| | | | |
|---|---|---|---|
| 2011/0165468 A1 | 7/2011 | Alias et al. | |
| 2013/0337314 A1* | 12/2013 | Essaki | H01M 4/134 |
| | | | 429/163 |
| 2014/0030599 A1 | 1/2014 | Lee et al. | |
| 2014/0050987 A1 | 2/2014 | Park et al. | |
| 2015/0072240 A1 | 3/2015 | Yoo et al. | |
| 2017/0271651 A1* | 9/2017 | Behan | H01M 4/134 |

FOREIGN PATENT DOCUMENTS

| | | | |
|---|---|---|---|
| JP | 2004047404 | A | 2/2004 |
| JP | 2012501951 | A | 1/2012 |
| KR | 20130109269 | A | 10/2013 |
| KR | 20140013729 | A | 2/2014 |
| KR | 20140022679 | A | 2/2014 |
| KR | 20150026925 | A | 3/2015 |

OTHER PUBLICATIONS

Park, Min-Sik et al., "Hydrogen Silsequioxane-derived Si/SiOx Nanospheres for High Capacity Lithium Storage Materials." ACS Applied Materials & Interfaces, 2014, vol. 6, No. 12, pp. 9608-9613.

Ng, S. H. et al., "Spray-Pyrolyzed Silicon/Disordered Carbon Nanocomposites for Lithium-Ion Battery Anodes." Journal of Power Sources, Jun. 29, 2007, vol. 174, No. 2, pp. 823-827.

Tao, Hua-Chao, et al., "Interweaved Si@SiOx/C Nanoporous Spheres as Anode Materials for Li-ion Batteries." Solid State Ionics, 2012, vol. 220, pp. 1-6.

Chinese Search Report for Application No. CN201680012923.6 dated Dec. 31, 2019.

Chinese Search Report for Application No. 201680012923.6 dated Jul. 24, 2020, 2 pages.

* cited by examiner

|  | CK | OK | SiK | Total (Atomic %) |
|---|---|---|---|---|
| Point 1 | 18.2 | 18.4 | 62.4 | 100 |
| Point 2 | 10.6 | 46.6 | 42.7 | 100 |
| Point 3 | 27.2 | 43.1 | 29.7 | 100 |

POROUS SILICON-SILICON OXIDE-CARBON COMPOSITE, AND METHOD OF PREPARING THE SAME

CROSS-REFERENCE TO RELATED APPLICATIONS

The present application is a national phase entry under 35 U.S.C. § 371 of International Application No. PCT/KR2016/003278 filed Mar. 30, 2016, which claims priority from Korean Patent Application No. 10-2015-0045280, filed on Mar. 31, 2015, all of which are incorporated herein by reference.

TECHNICAL FIELD

The present invention relates to a porous silicon-silicon oxide-carbon composite, and a method of preparing the same, and more particularly, to a porous silicon-silicon oxide-carbon composite of which volume expansion due to the intercalation of lithium ions is decreased and which, when included in a negative electrode active material, may further improve the performance of a lithium secondary battery, and a method of preparing the same.

BACKGROUND ART

Demand for secondary batteries as an energy source has been significantly increased as technology development and demand with respect to mobile devices have increased. Among these secondary batteries, lithium secondary batteries showing high energy density and high voltage, and having long cycle life and low self-discharging rate have been commercialized and widely used.

Generally, lithium secondary batteries are composed of a positive electrode comprising a positive electrode active material, a negative electrode comprising a negative electrode, a separator, and an electrolyte, and are secondary batteries of which charge and discharge are conducted via intercalation-decalation of lithium ions. The lithium secondary batteries have merits of showing high energy density, large electromotive force, and high capacity, and are applied in various fields.

Meanwhile, as the positive electrode active materials composing the positive electrode of the lithium secondary batteries, metal oxides such as $LiCoO_2$, $LiMnO_2$, $LiMn_2O_4$, and $LiCrO_2$ are used, and as the negative electrode active materials composing the negative electrode, metal lithium, graphite, carbon based materials such as activated carbon, or silicon oxides ($SiO_x$) are used. Among the negative electrode active materials, the metal lithium was mainly used in early days, but as the charge and discharge cycle progresses, lithium atoms are grown on the surface of the metal lithium and damaging a separator, thereby generating damaging phenomenon of a battery. Recently, the carbon based materials are widely used. However, the carbon based materials have a demerit of providing a small capacity, because the theoretical capacity thereof is just about 400 g.

Accordingly, diverse studies have been conducted to replace the carbon based material with silicon (Si) which has a high theoretical capacity (4,200 mAh/g) as a negative electrode active material. Reaction on the intercalation of lithium in silicon is as follows:

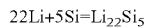
[Reaction 1]

However, in most silicon negative electrode materials, silicon volume expands up to the maximum of 300% by the lithium intercalation, and thus, a negative electrode is broken and high cycle properties are not attained. In addition, with the cycle progression, silicon volume expansion may arise due to the lithium intercalation, and fading mechanism such as pulverization, contact loses with conducting agents and current collectors, and the formation of unstable solid-electrolyte-interphase (SEI), may occur.

Accordingly, in order to solve the above-described defects, studies on silicon nano structures of which structure is controlled, such as nanowires, nanotubes, nanoparticles, porous structures, and composite formation with carbon based materials, have been reported. For example, carbon coated silicon nano structures were studied, but lithium secondary batteries using thereof as a negative electrode active material showed defects of failing the capacity retention of a negative electrode active material according to the repetition of charge and discharge cycle. Alternatively, studies on the synthesis of porous carbon-silicon composites have been conducted, but the limitation of synthetic technique of a composite was exposed due to the limitation of controlling technique on the shape of a complicated structure, high processing costs, or the like.

Recently, considering that the capacity of most positive electrode materials is very low to use the entire capacity of a silicon negative electrode, various studies on silicon oxide structures in which silicon nano regions are embedded in an amorphous silicon oxide lattice, and which has somewhat low capacity but excellent cycle properties, have been conducted.

In this regard, U.S. Patent Publication No. 2007/0254102 discloses a method of preparing a silicon-silicon oxide-carbon composite by coating the surface of a silicon-silicon oxide structure, which is synthesized by mixing after heating silicon and silicon oxide for gasification and precipitating, with a carbon based material. However, the method comprises a high temperature process at 1,600° C. or higher, and a synthetic process of silicon-silicon oxide and a carbon coating process are separately conducted to increase process costs.

In addition, U.S. Pat. No. 8,309,252 discloses a method of preparing a porous silicon-silicon oxide-carbon composite with a novel structure, which is directly obtained from a baked product of hydrogen silsesquioxane (HSQ) and a carbon precursor. However, the hydrogen silsesquioxane used in the preparation method is expensive, and the phase of a silicon oxide thus synthesized is strongly influenced by an initial precursor of the hydrogen silsesquioxane, and thus, the ratio control of silicon-oxygen is difficult. As a result, the oxidation degree of a composite thus synthesized is high ($SiO_x$, $1<x<1.7$), and low battery capacity is exhibited.

Accordingly, the development of a silicon-containing composite of which mass production is relatively easily attained with relatively low costs and by which defects due to the use of common silicon can be solved, and a method of preparing thereof is still required.

DISCLOSURE OF THE INVENTION

Technical Problem

An aspect of the present invention is to provide a porous silicon-silicon oxide-carbon composite of which volume expansion due to the intercalation of lithium ions is decreased to further increase the performance of a lithium secondary battery, and which may be included in a negative electrode active material.

Another aspect of the present invention is to provide a negative electrode active material comprising the porous silicon-silicon oxide-carbon composite, and a negative electrode comprising the negative electrode active material.

Another aspect of the present invention is to provide a lithium secondary battery comprising the negative electrode.

Still another aspect of the present invention is to provide a method of preparing the porous silicon-silicon oxide-carbon composite.

Technical Solution

To solve the tasks, according to an aspect of the present invention, there is provided a porous silicon-silicon oxide-carbon composite, comprising a silicon oxide-carbon structure and silicon particles, wherein the silicon oxide-carbon structure comprises a plurality of micropores, and the silicon particles are uniformly distributed in the silicon oxide-carbon structure.

In addition, according to another aspect of the present invention, there is provided a negative electrode active material comprising the porous silicon-silicon oxide-carbon composite, a negative electrode comprising the negative electrode active material, and a lithium secondary battery comprising the negative electrode.

Also, according to another aspect of the present invention, there is provided a method of preparing a porous silicon-silicon oxide-carbon composite, comprising:

(a) a step of preparing a precursor solution comprising a silicon source, a silicon oxide source, a carbon source, and a catalyst material;

(b) a step of conducting spray pyrolysis of the precursor solution to prepare composite particles in which silicon particles are uniformly distributed in a silicon oxide-carbon structure; and (c) a step of removing by-products generated from the catalyst material in the composite particles thus prepared to form pores in the silicon oxide-carbon structure.

Advantageous Effects

Since the porous silicon-silicon oxide-carbon composite of the present invention shows decreased volume expansion due to the intercalation of lithium ions and improved electric conductivity and has a porous structure, an electrolyte may easily penetrate into the porous structure, and output properties may be improved, thereby further improving the performance of a lithium secondary battery when included in a negative electrode active material. Accordingly, the porous silicon-silicon oxide-carbon composite of the present invention may be used for the preparation of a negative electrode active material for a lithium secondary battery and a lithium secondary battery comprising the same. In addition, the porous silicon-silicon oxide-carbon composite may be massively produced by a continuous process via minimized preparing steps according to the preparation method of the present invention.

BEST MODE FOR CARRYING OUT THE INVENTION

Figure 1:
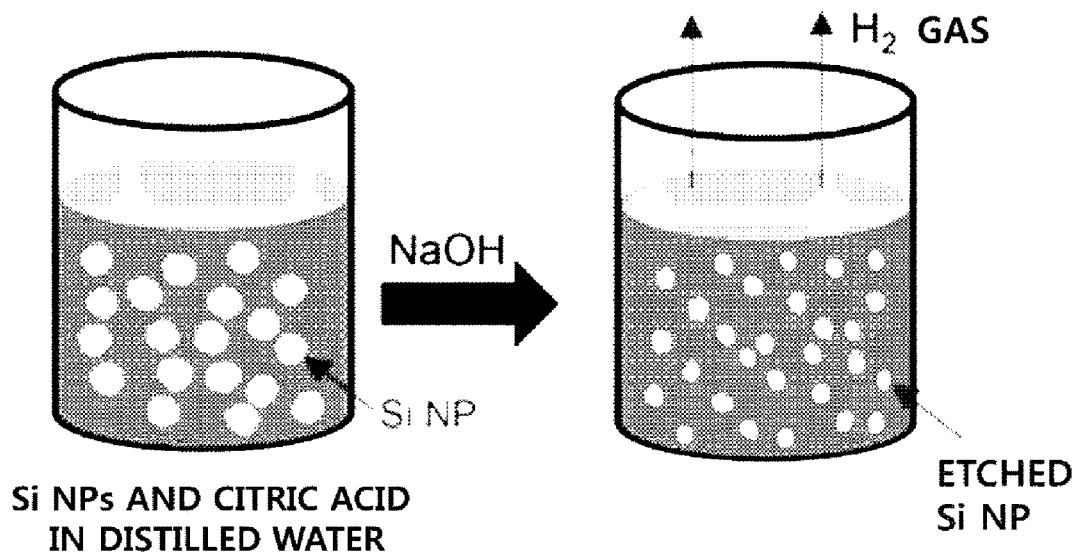
FIG. 1 schematically illustrates a preparing step of a precursor solution of step (a) according to Example 1.

Hereinafter, the present invention will be explained in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The porous silicon-silicon oxide-carbon composite of the present invention is a silicon-silicon oxide-carbon composite comprising a silicon oxide-carbon structure and silicon particles, wherein the silicon oxide-carbon structure comprises a plurality of micropores, and the silicon particles are uniformly distributed in the silicon oxide-carbon stricture.

In the porous silicon-silicon oxide-carbon composite of the present invention, the silicon oxide-carbon structure comprises a plurality of micropores, may be silicon oxide coated with carbon, and may have a lump shape, for example, a spherical or similar shape.

The silicon particles are uniformly distributed in the silicon oxide-carbon structure, and in this case, the distributed state of the silicon particles in the silicon oxide-carbon structure may be as follows. The one of the whole silicon particle may be positioned in the silicon oxide-carbon structure, or a portion of one silicon particle may be positioned in the silicon oxide-carbon structure and the remaining portion thereof may be exposed to the outer surface of the silicon oxide-carbon structure.

The silicon particles distributed in the silicon oxide-carbon structure may be silicon nanoparticles (Si NPs), silicon secondary particles obtained by agglomerating the silicon nanoparticles, or both of them.

Accordingly, the porous silicon-silicon oxide-carbon composite of the present invention is a composite in which a plurality of silicon particles are uniformly distributed in a silicon oxide-carbon structure having a lump shape, for example, a spherical shape or a similar shape, where at least one surface of the silicon nanoparticle or a portion or the whole of the surface of the silicon secondary particle lump formed by agglomerating at least one silicon nanoparticle is covered with carbon to form a structure. According to the shape of the silicon oxide-carbon structure, the composite may have a spherical or a similar shape.

The silicon oxide-carbon structure comprises a plurality of micropores, and during preparing the porous silicon-silicon oxide-carbon composite, by-products included in the silicon oxide-carbon structure are removed and at the positions where the by-products have been occupied, the micropores may be formed. Accordingly, the porous silicon-silicon oxide-carbon composite of the present invention may have a porous structure comprising a plurality of micropores.

The micropores may have an average pore size (diameter) of 0.5 to 10 nm, preferably, 1 to 8 nm, and more preferably, 2 to 6 nm when measured at the surface thereof. When the average size of the micropores is 0.5 nm or more, an electrolyte may appropriately penetrate, and a negative electrode active material may be activated in a short time, thereby securing an appropriate space for relieving volume expansion. When the average size of the micropores is 10 nm or less, the separation of the silicon particles included in the porous carbon-silicon oxide structure from the porous carbon-silicon oxide structure may be prevented during the process of charge and discharge.

A measuring method of the average pore size is not specifically limited, and may be measured via a graph on nitrogen adsorption isotherm results and pore size distribution.

Meanwhile, when the silicon particles included in the porous silicon oxide-carbon composite are silicon secondary particles formed by agglomerating silicon nanoparticles, the composite may additionally have a pore type structure which is produced when the silicon nanoparticles form the silicon secondary particles. However, since such a pore type structure is formed via the agglomeration of silicon nanoparticles which are primary particles into a secondary particle shape, the size or shape thereof is not constant, and the pore type structure is partially and restrictively present only in the silicon secondary particles. Thus, such pores are differentiated from the micropores formed by the removal of by-products.

In the porous silicon-silicon oxide-carbon composite, the silicon particles are uniformly distributed in the silicon oxide-carbon structure, and excellent mechanical properties such as improved strength are exhibited and a porous structure is attained. Accordingly, the volume expansion of silicon generated during the charge and discharge of a secondary battery may be accommodated, and defects accompanied with the volume expansion of silicon may be effectively restrained.

The silicon particles may be etched by water, a catalyst material, or both of them, and the silicon particles may have an average particle diameter ($D_{50}$) of 1 to 90 nm, preferably, 2 to 80 nm, and more preferably, 5 to 70 nm.

When the average particle diameter of the silicon particles is 1 nm or more, defects of escaping silicon particles through the micropores of the silicon oxide-carbon structure may be prevented. In addition, when the average particle diameter of the silicon particles is 90 nm or less, micropores included in the silicon oxide-carbon structure may appropriately restrain the volume expansion of silicon, which is generated during charge and discharge.

In the porous silicon-silicon oxide-carbon composite, the amount of the silicon particles may be from 10 to 50 wt %, preferably, 20 to 40 wt % based on the total amount of the porous silicon-silicon oxide-carbon composite.

The silicon oxide may be prepared from a silicon oxide source ($[SiO_3]^-_{(aq)}$) which is produced by etching silicon using the catalyst material, and may be represented by $SiO_x$ ($0.5 \leq x \leq 1.5$). In this case, $SiO_x$ may be a mixture of crystalline Si and amorphous $SiO_2$.

In the porous silicon-silicon oxide-carbon composite, the amount of the silicon oxide may be from 20 to 60 wt %, preferably, from 30 to 50 wt % based on the total amount of the porous silicon-silicon oxide-carbon composite.

Examples of the catalyst material may be at least one selected from the group consisting of lithium hydroxide (LiOH), sodium hydroxide (NaOH), potassium hydroxide (KOH), rubidium hydroxide (RbOH), cesium hydroxide (CsOH), ammonium hydroxide ($NH_4OH$), calcium hydroxide ($Ca(OH)_2$), and magnesium hydroxide ($Mg(OH)_2$), and preferably, sodium hydroxide or potassium hydroxide may be used.

The carbon may be formed by carbonizing a carbon source, and examples of the carbon source may be at least one selected from the group consisting of citric acid, glucose, cellulose, sucrose, sugar, sugar polymers, polysaccharides, polyimides, polyacrylonitriles, polystyrenes, polydivinylbenzenes, polyvinylpyridines, polypyrroles, polythiophenes, polyanilines, and a copolymer thereof.

In the porous silicon-silicon oxide-carbon composite, the amount of the carbon may be from 5 to 30 wt %, preferably, from 10 to 20 wt % based on the total amount of the porous silicon-silicon oxide-carbon composite.

The porous silicon-silicon oxide-carbon composite may have a specific surface area of 100 to 500 $m^2/g$, preferably, 120 to 300 $m^2/g$, and more preferably, 150 to 250 $m^2/g$.

The porous silicon-silicon oxide-carbon composite may have an average particle diameter ($D_{50}$) of 0.1 to 25 μm, preferably, 0.5 to 10 μm, and more preferably, 1 to 5 μm.

When the average particle diameter of the porous silicon-silicon oxide-carbon composite is 0.1 μm or more, the density decrease of an electrode may be prevented and an appropriate capacity per volume may be attained. In addition, when the average particle diameter is 25 μm or less, a slurry form forming an electrode may be appropriately coated to a uniform thickness.

In the present invention, the average particle diameter ($D_{50}$) of the silicon particles and the porous silicon-silicon oxide-carbon composite may be defined as a particle diameter based on 50% standard of particle diameter distribution. The average particle diameter is not specifically limited, and may be measured by using, for example, a laser diffraction method or scanning electron microscope (SEM) photographic images. By the laser diffraction method, a particle diameter from a submicron region to several mm degrees may be measured, and results with high reproducibility and high resolution may be obtained.

The porous silicon-silicon oxide-carbon composite of the present invention has decreased volume expansion due to the intercalation of lithium ions, may further improve the performance of a lithium secondary battery, and may be used for the preparation of a negative electrode active material of a lithium secondary battery.

Accordingly, the present invention provides a negative electrode active material comprising the porous silicon-silicon oxide-carbon composite, a negative electrode comprising the negative electrode active material, and a lithium secondary battery comprising the negative electrode.

In addition, the present invention provides a method of preparing the porous silicon-silicon oxide-carbon composite, and the method of preparing a porous silicon-silicon oxide-carbon composite comprises (a) a step of preparing a precursor solution comprising a silicon source, a silicon oxide source, a carbon source, and a catalyst material; (b) a step of conducting spray pyrolysis of the precursor solution to prepare composite particles in which silicon particles are uniformly distributed in a silicon oxide-carbon structure; and (c) a step of removing by-products generated from the catalyst material in the composite particles thus prepared to form pores in the silicon oxide-carbon structure.

(a) Step of Preparing Precursor Solution Comprising Silicon Source, Silicon Oxide Source, Carbon Source and Catalyst Material The method of preparing a porous silicon-silicon oxide-carbon composite of the present invention may first comprise a step of preparing a precursor solution comprising a silicon source, a silicon oxide source, a carbon source, and a catalyst material as step (a).

In an embodiment of the present invention, the preparation of the precursor solution may be accomplished by a method comprising a process of dissolving or dispersing a silicon source, a carbon source and a catalyst material in a solvent.

The silicon source may comprise silicon nanoparticles (Si, NPs), and the average particle diameter ($D_{50}$) of the silicon nanoparticles may be from 10 to 100 nm, preferably, from 20 to 90 nm, and more preferably, from 30 to 80 nm.

When the average particle diameter of the silicon nanoparticles is less than 10 nm, silicon particles may disappear during etching, and the size of the silicon particles included in the porous silicon-silicon oxide-carbon composite thus prepared may become too small, and the silicon particles may escape through the pores of a silicon oxide-carbon structure. In addition, when the average particle diameter of the silicon nanoparticles is greater than 100 nm, the size of the silicon particles included in the porous silicon-silicon oxide-carbon composite thus prepared may become too large, and the restraint of the volume expansion of silicon by the pores of the silicon oxide-carbon structure during charge and discharge is limited.

The silicon oxide source may be produced and included via the etching of the silicon source using the catalyst material. However, the possibility of using a material comprising a separate silicon oxide source ($[SiO_3]^-_{(aq)}$) is not excluded.

The carbon source may be at least one selected from the group consisting of citric acid, glucose, cellulose, sucrose, sugar, sugar polymers, polysaccharides, polyimides, polyacrylonitriles, polystyrenes, polydivinylbenzenes, polyvinylpyridines, polypyrroles, polythiophenes, polyanilines, and a copolymer thereof, and preferably, citric acid, glucose, polyvinylpyridines, or polypyrrole may be used, without limitation.

The catalyst material may accelerate the etching rate of the silicon source and the carbonizing rate of the carbon source. Particularly, the catalyst material may etch the silicon source and produce the silicon oxide source ($[SiO_3]^-_{(aq)}$), and may play the role of accelerating the decomposition and the carbonizing rate of the carbon source during spray pyrolysis. In addition, the catalyst material may be transformed into a by-product shape during the spray pyrolysis of step (b), and removed by water, acid or base in step (c) so as to form micropores in the silicon oxide-carbon structure.

As the catalyst material, at least one selected from the group consisting of lithium hydroxide (LiOH), sodium hydroxide (NaOH), potassium hydroxide (KOH), rubidium hydroxide (RbOH), cesium hydroxide (CsOH), ammonium hydroxide ($NH_4OH$), calcium hydroxide ($Ca(OH)_2$), and magnesium hydroxide ($Mg(OH)_2$) may be used, and preferably, sodium hydroxide or potassium hydroxide may be used, without limitation.

As the solvent, a polar solvent may be used, and the polar solvent may be at least one selected from the group consisting of water, ethanol, and methanol, or a mixture solvent of at least two thereof.

The dissolution or dispersion may be conducted by applying ultrasonic waves to the precursor solution. The degree of dissolution or dispersion may be improved by applying the ultrasonic waves for 10 minutes to 10 hours, preferably, for 30 minutes to 3 hours, without limitation.

The precursor solution thus prepared may be stirred for 6 to 24 hours, preferably, for 8 to 18 hours, to attain the etching of the silica source, the production of the silicon oxide source and the decomposition of the carbon source.

According to the concentration of the silicon source, the carbon source and the catalyst material in the precursor solution, the shape, porosity, and capacity of a porous silicon-silicon oxide-carbon composite comprising silicon particles in a porous silicon oxide-carbon structure, may be determined. In addition, the component ratio of the silicon source and the carbon source in the precursor solution is not specifically limited and may be appropriately controlled according to the desired size and shape of particles.

In an embodiment of the present invention, the concentration of the silicon source in the precursor solution may be from 0.01 to 3 M, preferably, from 0.01 to 1 M. When the concentration of the silicon source is 0.01 M or more, in the porous silicon-silicon oxide-carbon composite thus prepared, a composite in which silicon particles are uniformly distributed in a porous silicon oxide-carbon structure may be sufficiently produced. In addition, when the concentration is 3 M or less, the silicon source which is a raw material may be smoothly dissolved or dispersed in a solvent.

In an embodiment of the present invention, the concentration of the carbon source in the precursor solution may be from 0.01 to 3 M, preferably, from 0.01 to 1 M. When the concentration of the carbon source is 0.01 M or more, a silicon oxide-carbon structure may be formed by sufficiently coating the silicon oxide of the porous silicon-silicon oxide-carbon composite thus prepared with carbon, thereby improving the electric conductivity of the silicon oxide. In addition, when the concentration is 3 M or less, the carbon source which is a raw material may be smoothly dissolved or dispersed in a solvent.

In an embodiment of the present invention, the concentration of the catalyst in the precursor solution may be from 0.01 mM to 0.1 M, preferably, 0.1 mM to 0.05 M. When the concentration of the catalyst is 0.01 mM or more, a sufficient amount of a silicon oxide source may be produced, and an appropriate amount of pores may be formed in a silicon-silicon oxide-carbon composite. When the concentration is 0.1 M or less, catalyst reaction of a sufficient amount of may be accomplished.

The total concentration of the precursor solution may be from 0.01 to 3 M, preferably, from 0.01 to 2 M.

Meanwhile, the method of preparing a porous silicon-silicon oxide-carbon composite of the present invention may further comprise after preparing the precursor solution via step (a), a step of stirring the precursor solution for 30 minutes to 48 hours, preferably, 3 to 18 hours. Through the additional stirring step, etching reaction on a silicon source and catalyst reaction on a carbon source included in the precursor solution may be sufficiently conducted.

(b) Step of Preparing Composite Particles in which Silicon Particles are Uniformly Distributed in Silicon Oxide-Carbon Structure by Spray Pyrolysis of Precursor Solution The method of preparing a porous silicon-silicon oxide-carbon composite of the present invention may comprise (b) a step of preparing composite particles by conducting spray pyrolysis of the precursor solution prepared in step (a).

By the spray pyrolysis method of step (b), composite particles in which precursor materials such as a silicon source, a silicon oxide source, a carbon source, and by-products produced from a catalyst material are uniformly distributed, specifically, composite particles comprising silicon, silicon oxide, carbon and by-products respectively derived from the silicon source, the silicon oxide source, the carbon source, and the catalyst material, where the by-products are uniformly distributed in the composite particles, may be prepared, and by the method, effects of minimizing the preparing steps of the method of preparing the porous silicon-silicon oxide-carbon composite of the present invention and mass production may be exhibited.

In an embodiment of the present invention, the spray pyrolysis may comprise processes of forming droplets by spraying the precursor solution, and drying and pyrolyzing the droplets. Through the pyrolysis of the droplets, the solvents included in the droplets are removed, and the silicon oxide source and the carbon source are pyrolyzed to form silicon oxide ($SiO_2$) and carbon, thereby forming silicon-silicon oxide-carbon composite particles in which silicon oxide is coated with carbon.

The silicon-silicon oxide-carbon composite particles prepared in step (b) may comprise by-products produced from the catalyst in addition to silicon particles, silicon oxide, and carbon, and may have a shape obtained by uniformly distributing the silicon particles in the silicon oxide coated with the carbon, i.e., a shape obtained by uniformly distributing the silicon particles in a silicon oxide-carbon structure. In addition, the by-products may be evenly distributed in the whole silicon-silicon oxide-carbon composite particles except for the silicon particles.

In an embodiment of the present invention, the spray pyrolysis may be conducted in a spray pyrolysis apparatus comprising a spraying apparatus, a reactor, and a collecting part. The droplets of the precursor solution may be formed by spraying the precursor solution using the spaying apparatus. For example, the precursor solution prepared in step (a) may be supplied into the spraying apparatus (droplet generating apparatus) of the spray pyrolysis apparatus, and the precursor solution may be uniformly sprayed into the reactor in a minute droplet shape with a micrometer size. The sprayed droplets may be dried, and pyrolyzed in the reactor of the spray pyrolysis apparatus to prepare the composite particles.

Composite particles with a desired size may be easily prepared by a simple preparation process using the spray pyrolysis method, and the method is based on a continuous process. Accordingly, high preparation efficiency (particle forming yield of 80% or more) may be attained.

In order to completely transform the droplets injected into the reactor into the composite particles, it is important to control the retention time of the droplets in the reactor in an appropriate range. The retention time of the droplets in the reactor is affected by the flow rate of the droplets, i.e., the flow rate of a carrier gas for transporting the droplets to the reactor, and in this case, the temperature of the reactor during pyrolysis is also an important factor.

The droplets may be injected to the reactor in a flow rate of 0.5 to 40 L/min, preferably, 0.5 to 40 L/min. Within the range, appropriate retention time of the droplets in the reactor may be attained, and the optimized temperature of the reactor may be maintained.

The droplets injected into the reactor may stay for 0.1 to 20 seconds, preferably, 1 to 10 seconds, without limitation.

The spraying of the precursor solution may be conducted by using an ultrasonic spraying apparatus, an air nozzle spraying apparatus, an ultrasonic nozzle spraying apparatus, a filter expansion droplet producing apparatus, or an electrostatic spraying apparatus. For example, when the ultrasonic nozzle spraying apparatus is used, the preparation of a composite comprising minute silicon particles with a size from sub microns to several microns in a silicon oxide-carbon structure in a high concentration, may be possible. When the air nozzle spraying apparatus and the ultrasonic nozzle spraying apparatus are used, particles with a size of microns may be massively produced.

In an embodiment of the present invention, the spraying of the precursor solution may be conducted by ultrasonic vibrations with a frequency of 0.1 to 10 MHz, preferably, ultrasonic vibrations with a frequency of 1 to 8 MHz.

The droplets may have a particle diameter of 0.5 to 100 μm, preferably, an average particle diameter of 5 to 30 μm. When the particle diameter of the droplet is 5 μm or more, the composite particles thus produced may not be excessively small but have an appropriate size, and when the particle diameter is 100 μm or less, the composite particles thus produced may not be excessively large.

The spray pyrolysis comprises a heat treatment process in a temperature range of 200 to 1,200° C., and the temperature range may preferably be from 500 to 1,000° C. When the temperature of the spray pyrolysis satisfies the above range, the precursor materials composing the droplets may be appropriately transformed into particles. The temperature of the pyrolysis may be appropriately controlled according to the kind of the carbon source.

(c) Step of Forming Pores in Silicon Oxide-Carbon Structure by Removing by-Products Produced from Catalyst Material in Composite Particles Thus Prepared The method of preparing a porous silicon-silicon oxide-carbon composite of the present invention may comprise (c) a step of removing by-products produced from the catalyst material in the composite particles prepared in step (b) to from pores in the silicon oxide-carbon structure.

The step of removing by-products of step (c) may be conducted using water, an acid solution, or a base solution. Preferably, the by-products derived from the catalyst material, included in the composite particles, and formed by the spray pyrolysis, may be removed by a method such as dissolution by washing for a certain time using water (distilled water), thereby forming micropores in the silicon oxide-carbon composite.

The by-products may be produced from the catalyst material, the carbon source, or both of them via the spray pyrolysis of step (b), and may be $Na_2O$, $Na_2CO_3$, or the like. By removing the by-products, micropores may be formed at the position where the by-products have occupied. In this case, the structure or physical properties of the composite particles are not affected by the removal of the by-products.

In an embodiment of the present invention, the removing step of the by-products in step (c) may comprise a washing process using distilled water for 30 minutes to 10 hours, preferably, for 1 to 5 hours, and the removing step may be conducted at a temperature of 10 to 50° C., preferably, 20 to 30° C.

By removing the by-products produced from the catalyst material in the composite particles thus prepared via step (c), pores may be formed in the silicon oxide-carbon structure to prepare a porous silicon-silicon oxide-carbon composite.

Through the above-described preparation method of the present invention and the spray pyrolysis, a silicon-silicon oxide-carbon composite with improved porosity may be simply prepared by a continuous process.

Accordingly, the present invention provides a porous silicon-silicon oxide-carbon composite prepared by the preparation method, and the porous silicon-silicon oxide-carbon composite is a silicon-silicon oxide-carbon composite comprising a silicon oxide-carbon structure and silicon particles, where the silicon oxide-carbon structure comprises a plurality of micropores, and the silicon particles are uniformly distributed in the silicon oxide-carbon structure.

The porous silicon-silicon oxide-carbon composite may have a specific surface area of 100 to 500 $m^2/g$, preferably, 120 to 300 $m^2/g$, and more preferably, 150 to 250 $m^2/g$.

The porous silicon-silicon oxide-carbon composite may have an average particle diameter (D50) of 0.1 to 25 μm, preferably, 0.5 to 10 μm, and more preferably, 1 to 5 μm.

When the average particle diameter of the porous silicon-silicon oxide-carbon composite is 0.1 μm or more, the decrease of the density of an electrode may be prevented and an appropriate capacity per volume may be attained. When the average particle diameter is 25 μm or less, a slurry for forming an electrode may not be applied in a uniform thickness.

In the porous silicon-silicon oxide-carbon composite prepared by the preparation method of the present invention, the volume expansion due to the intercalation of lithium ions may be decreased, and the performance of a lithium secondary battery may be further improved. Accordingly, the composite may be used for the preparation of a negative electrode active material in a secondary battery.

The porous silicon-silicon oxide-carbon composite according to an embodiment of the present invention, and the porous silicon-silicon oxide-carbon composite prepared by an embodiment of the preparation method may be used as a negative electrode active material by itself, or may be mixed with a material which may form an alloy with carbon and/or lithium and used as a negative electrode active material. As the material which may form an alloy with lithium may comprise at least one selected from the group consisting of Si, SiOx, Sn, SnOx, Ge, GeOx, Pb, PbOx, Ag, Mg, Zn, ZnOx, Ga, In, Sb and Bi.

Accordingly, the present invention provides a negative electrode active material comprising the porous silicon-silicon oxide-carbon composite, a negative electrode comprising the negative electrode active material, and a lithium secondary battery comprising the negative electrode. The lithium secondary battery may comprise a positive electrode, a negative electrode, and a separator disposed between the positive electrode and the negative electrode.

The negative electrode may be prepared by a common method well known in the art, for example, by mixing and stirring the negative electrode active material and additives such as a binder and a conductive agent to prepare a negative electrode active material slurry, and applying thereof on a negative electrode current collector, drying and compressing.

The binder may be used to bind negative electrode active material particles to maintain a molded body, and commonly used binders for the preparation of a slurry for a negative electrode active material may be used, without specific limitation, comprising, for example, non-aqueous binders such as polyvinyl alcohol, carboxymethyl cellulose, hydroxypropylene cellulose, diacetylene cellulose, polyvinyl chloride, polyvinyl pyrrolidone, polytetrafluoroethylene (PTFE), polyvinylidene fluoride (PVdF), polyethylene and polypropylene, and any aqueous binder selected from the group consisting of an acrylonitrile-butadiene rubber, a styrene-butadiene rubber and an acryl rubber, or a mixture of at least two thereof. The aqueous binders are economic, eco-friendly, and harmless when considering the health of workers when compared to the non-aqueous binders, and have better binding effect than the non-aqueous binders, and thus, the ratio of an active material per the same volume may be increased to increase capacity. The aqueous binder may preferably be a styrene-butadiene rubber.

The binder may be included in an amount of 10 wt % or less in the total amount of the slurry for a negative electrode active material, and particularly, may be included in an amount of 0.1 wt % to 10 wt %. When the amount of the binder is less than 0.1 wt %, effects obtainable by the use of the binder is insignificant and undesirable, and when the amount is greater than 10 wt %, capacity per volume may be decreased due to the decrease of a relative amount of an active material according to the increase of the amount of the binder and undesirable.

The conductive agent may be used without particular limitation as long as it has conductivity without causing chemical change of a battery. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powders such as a carbon fluoride powder, an aluminum powder, and a nickel powder; conductive whiskers such as zinc oxide whiskers and potassium titanate whiskers; conductive metal oxides such as titanium oxide; or conductive materials such as polyphenylene derivatives. The conductive agent may be used in an amount of 1 wt % to 9 wt % based on the total amount of a slurry for a negative electrode active material.

A negative electrode current collector used in the negative electrode according to an embodiment of the present invention may have a thickness of 3 μm to 500 μm. The negative electrode current collector is not particularly limited as long as it has conductivity without causing the chemical change of a battery. For example, copper, gold, stainless steel, aluminum, nickel, titanium, fired carbon, or copper or stainless steel that is surface-treated with carbon, nickel, titanium, silver, or the like, an aluminum-cadmium alloy, or the like may be used. In addition, microscopic irregularities may be formed on the surface of the current collector to improve the adhesiveness of the negative electrode active material, and the negative electrode current collector may be used in various shapes such as a film, a sheet, a foil, a net, a porous body, a foamed body, a non-woven fabric body, or the like.

The positive electrode may be prepared by a common method well known in the art, for example, by mixing and stirring a positive electrode active material, a solvent, and additives such as a binder, a conductive agent, and a dispersant to prepare a slurry, applying (coating) thereof on a current collector of a metal material, compressing, and drying.

The current collector of a metal material may be a metal to which the slurry of a positive electrode active material is easily attached, and is not particularly limited as long as it has conductivity without causing the chemical change of a battery in a voltage range of the battery. For example, stainless steel, aluminum, nickel, titanium, fired carbon, or aluminum or stainless steel that is surface-treated with carbon, nickel, titanium, silver, or the like, may be used. In addition, microscopic irregularities may be formed on the surface of the current collector to improve the adhesiveness of the positive electrode active material. The current collector may be used in various shapes such as a film, a sheet, a foil, a net, a porous body, a foamed body, a non-woven fabric body, or the like, and may have a thickness of 3 to 500 μm.

The positive electrode active material may be a layered compound or a compound substituted with one or more transition metals such as lithium cobalt oxide ($LiCoO_2$), lithium nickel oxide ($LiNiO_2$), $Li[Ni_xCo_yMn_zM_v]O_2$ (where M is any one element selected from the group consisting of Al, Ga and In or at least two thereof; $0.3 \leq x < 1.0$, $0 \leq y$, $z \leq 0.5$, $0 \leq v \leq 0.1$, and $x+y+z+v=1$), $Li(Li_aM_{b-a-b}M'_b)O_{2-c}A_c$ (where $0 \leq a \leq 0.2$, $0.6 \leq b \leq 1$, $0 \leq b' \leq 0.2$, $0 \leq c \leq 0.2$; M comprises Mn and at least one selected from the group consisting of Ni, Co, Fe, Cr, V, Cu, Zn and Ti; M' is at least one selected from the group consisting of Al, Mg and B; and A is at least one selected from the group consisting of P, F, S and N); lithium manganese oxide such as formula $Li_{1+y}Mn_{2-y}O_4$ (where y is 0-0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; Ni site type lithium nickel oxide represented by formula $LiNi_{1-y}M_yO_2$ (where M=Co, Mn, Al, Cu, Fe, Mg, B or Ga, and y=0.01-0.3); lithium manganese composite oxide represented by formula $LiMn_{2-y}M_yO_2$ (where M=Co, Ni, Fe, Cr, Zn or Ta, and y=0.01-0.1) or $Li_2Mn_3MO_8$ (where M=Fe, Co, Ni, Cu or Zn); $LiMn_2O_4$ of which a portion of Li is substituted with alkaline earth metal ions; disulfide compounds; $Fe_2(MoO_4)_3$, etc., without limitation.

As the solvents for forming the positive electrode, organic solvents such as N-methyl pyrrolidone (NMP), dimethyl formamide (DMF), acetone, and dimethyl acetamide, water, or the like may be used. The solvents may be used alone or as a mixture of at least two thereof. The amount used of the solvent may be sufficient as long as the positive electrode active material, the binder and the conductive agent may be dissolved and dispersed in consideration of the coated thickness of a slurry and preparation yield.

The binder may comprise various kinds of binder polymers comprising a copolymer of polyvinylidene fluoride-hexafluoropropylene (PVDFO-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, a styrene-butadiene rubber (SBR), a fluorine rubber, a poly acrylic acid and a polymer of which hydrogen is substituted with Li, Na or Ca, or various copolymers.

The conductive agent may comprise any one without particular limitation as long as it has conductivity without causing chemical change of a battery. For example, graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nano tubes; metal powders such as a fluorocarbon powder, an aluminum powder, and a nickel powder; conductive whiskers such as zinc oxide whiskers and potassium titanate whiskers; conductive metal oxides such as titanium oxide; and conductive materials such as polyphenylene derivatives, may be used. The conductive agent may be included in an amount of 1 wt % to 20 wt % based on the total amount of a positive electrode slurry.

The dispersant may use an aqueous dispersant or an organic dispersant such as N-methyl-2-pyrrolidone.

In addition, as the separator, a common porous polymer film used as a separator, for example, a porous polymer film prepared from a polyolefin-based polymer such as an ethylene homopolymer, a propylene homopolymer, an ethylene-butene copolymer, an ethylene-hexene copolymer, and an ethylene-methacrylate copolymer, or a laminated structure having two or more layers thereof, may be used. Also, a typical porous nonwoven fabric, for example, a nonwoven fabric formed of high melting point glass fibers or polyethylene terephthalate fibers may be used.

A lithium salt included as an electrolyte used in the present invention may be any one commonly used as an electrolyte for a lithium secondary battery, without limitation, for example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may comprise organic liquid electrolytes, inorganic liquid electrolytes, solid polymer electrolytes, gel-type polymer electrolytes, solid inorganic electrolytes, molten-type inorganic electrolytes, or the like, without limitation.

The appearance of the lithium secondary battery of the present invention is not specifically limited, but may be a cylindrical type using a can, a prismatic type, a pouch type, or a coin type.

The lithium secondary battery according to the present invention may be used in a battery cell used as a power source of a small device, and also may be used as a unit battery in a medium and large sized battery module comprising a plurality of battery cells.

The medium and large sized device may preferably comprise electric vehicles, hybrid electric vehicles, plug-in hybrid electric vehicles, and a power storage system, without limitation.

BEST MODE FOR CARRYING OUT THE INVENTION

Examples

Hereinafter, the present invention will be described in detail referring to examples and experimental examples. The invention may, however, be embodied in many different forms and should not be construed as being limited to the examples set forth herein. Examples of the present invention are provided to more completely explain the present invention to a person with ordinary skill in the art.

Example 1: Preparation of Porous Silicon-Silicon Oxide-Carbon Composite

<Step (a): Step of Preparing Precursor Solution>

Silicon nanoparticles (KCC Korea) with an average particle diameter of about 70 nm, citric acid, and sodium hydroxide (NaOH) were dissolved and dispersed in water to attain 0.05 M, 0.02 M, and 3.75 mM, respectively, to prepare a precursor solution with a concentration of 0.025 M.

To the precursor solution, ultrasonic waves were applied for 1 hour by using a tip sonicator (750 W, VCX 750; Sonics & Materials Inc., Newton, Conn.) to increase the degree of dispersion and dissolution, and the precursor solution was additionally stirred for 12 hours to sufficiently achieve the following reactions:

$$[Si(s)+NaOH+H_2O \rightarrow \text{etched } Si+[SiO_3]^-(aq)+Na^+(aq)+H_2(g)]$$

$$Na^+(aq)+C_6H_8O_7 \rightarrow C_6H_7O_7^-Na^+(aq)$$

FIG. 1 schematically illustrates a preparing step of a precursor solution of step (a). Referring to FIG. 1, the precursor solution of the present invention may be prepared by injecting a silicon source (silicon nanoparticles (Si NPs)) and a carbon source (citric acid) to a solvent (water) contained in a vessel, and adding a catalyst material (NaOH) thereto. Through the action of the catalyst material, silicon nanoparticles which are the silicon source are etched to produce a portion of a silicon oxide source, and a hydrogen gas is released from the precursor solution.

<Step (b): Step of Preparing Composite Particles Via Spray Pyrolysis>

Into a spraying apparatus of a spray pyrolysis apparatus comprising the spraying apparatus, a reactor and a collecting part, the precursor solution obtained in step (a) was added to produce minute droplets with about 1 to about 20 μm. The droplets thus produced were injected into the reactor, left at the reactor temperature of about 700° C. for about 5 seconds, and baked to obtain composite particles.

In this case, an industrial humidifier (US-06N, H tech), which was operated at a frequency of 1.7 MHz was used as the spraying apparatus, and a nitrogen ($N_2$) gas was used as a carrier gas for effectively supplying a large amount of droplets produced by six ultrasonic atomizers into the reactor. In this case, the flow amount was kept constant at 5 L/min, and a quartz reaction tube with a diameter of 55 mm and a length of 1.2 m was used as the reactor. Through the reaction, composite particles in which silicon particles were uniformly distributed in a silicon oxide-carbon structure were obtained from the precursor solution.

<Step (c): Step of Removing by-Products Formed from Catalyst Material>

Micropores were formed in the composite particles by removing sodium salts ($Na_2O$, $Na_2CO_3$, or the like), which were by-products produced from a catalyst in the composite particles obtained in step (b), using distilled water at room temperature for 2 hours. Then, the product finally obtained was dried at 70° C. in vacuum conditions for 5 hours to obtain a porous silicon-silicon oxide-carbon composite in which silicon particles were uniformly distributed in a porous silicon oxide-carbon structure.

Figure 2:
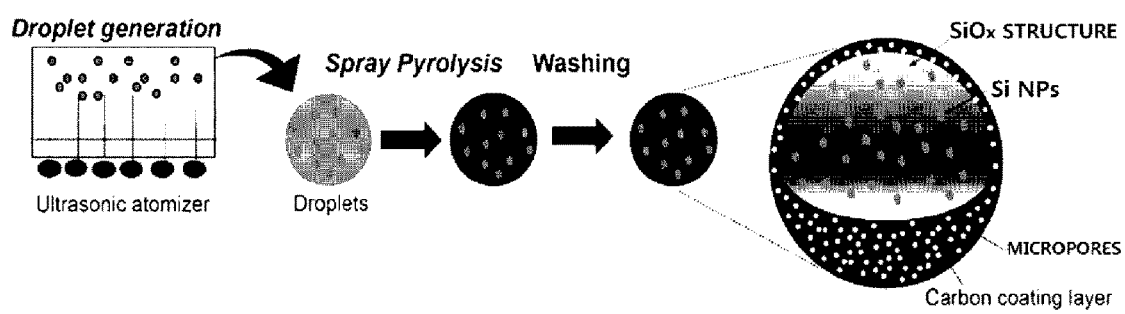
FIG. 2 schematically illustrates step (b) and step (c) according to Example 2.

In FIG. 2, step (b) and step (c) are schematically illustrated. Referring to FIG. 2, composite particles in which silicon particles are uniformly distributed in a porous silicon oxide-carbon structure may be prepared via spray pyrolysis using droplets produced by an ultrasonic atomizer (ultrasonic spraying apparatus), and through the step of removing by-products formed from a catalyst material of step (c), the by-products produced from the catalyst material in the composite particles thus prepared were removed to form micropores in the silicon oxide-carbon structure, thereby producing a porous silicon-silicon oxide-carbon composite.

Example 2: Preparation of Negative Electrode and Lithium Secondary Battery

<Preparation of Negative Electrode>

The porous silicon-silicon oxide-carbon composite prepared in Example 1 as a negative electrode active material, acetylene black as a conductive agent, and polyacrylate (PAA) as a binder were mixed in a molar ratio of 60:20:20, and then the mixture was mixed with water ($H_2O$) as a solvent, to prepare a uniform negative electrode active material slurry.

The negative electrode active material slurry thus prepared was applied on one surface of a copper current collector to a thickness of 65 μm, dried and rolled, and then was punched to a certain size to prepare a negative electrode.

<Preparation of Lithium Secondary Battery (Coin Type Half Cell)>

A Li metal was used as a counter electrode, an olefin separator was disposed between the negative electrode and the Li metal, and an electrolyte in which 1 M $LiPF_6$ was dissolved in a mixture solvent of ethylene carbonate (EC) and diethyl carbonate (DEC) in a volume ratio of 30:70 was injected to prepare a coin type half cell.

Comparative Example 1: Preparation of Negative Electrode Active Material

Silicon nanoparticles (KCC Korea) with an average particle diameter of about 70 nm were used without additional treatment as a negative electrode active material.

Comparative Example 2: Preparation of Negative Electrode and Lithium Secondary Battery A coin type half cell was prepared by the same method as described in Example 2 except for using the silicon nanoparticles of Comparative Example 1, which was a silicon-based negative electrode active material, as the negative electrode active material.

Experimental Example 1: SEM Photographic Images

Figure 3:
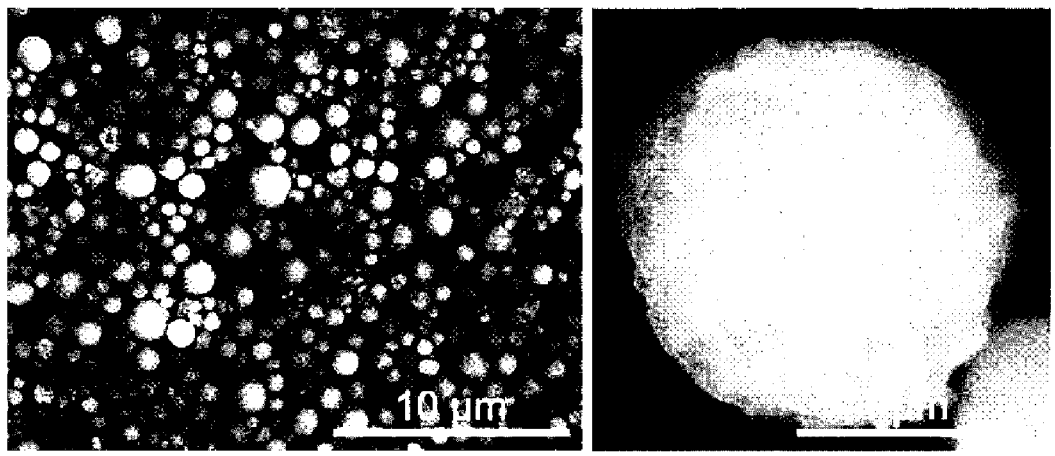
FIG. 3 illustrates scanning electron microscope (SEM) photographic images of a porous silicon-silicon oxide-carbon composite prepared in Example 1.

By using a scanning electron microscope (SEM), the picture of the porous silicon-silicon oxide-carbon composite prepared in Example 1 was taken, and the results are shown in FIG. 3.

In FIG. 3, images of the porous silicon-silicon oxide-carbon composite prepared in Example 1 are respectively shown on the scale of 10 μm and 1 μm, and from each image, the formation of spherical composite particles was secured. From the scanning electron microscopic photographic image with high magnification of 1 μm, the uniform distribution of minute primary particles in the whole secondary particles can be secured.

Experimental Example 2: TEM Photographic Images

Figure 4:
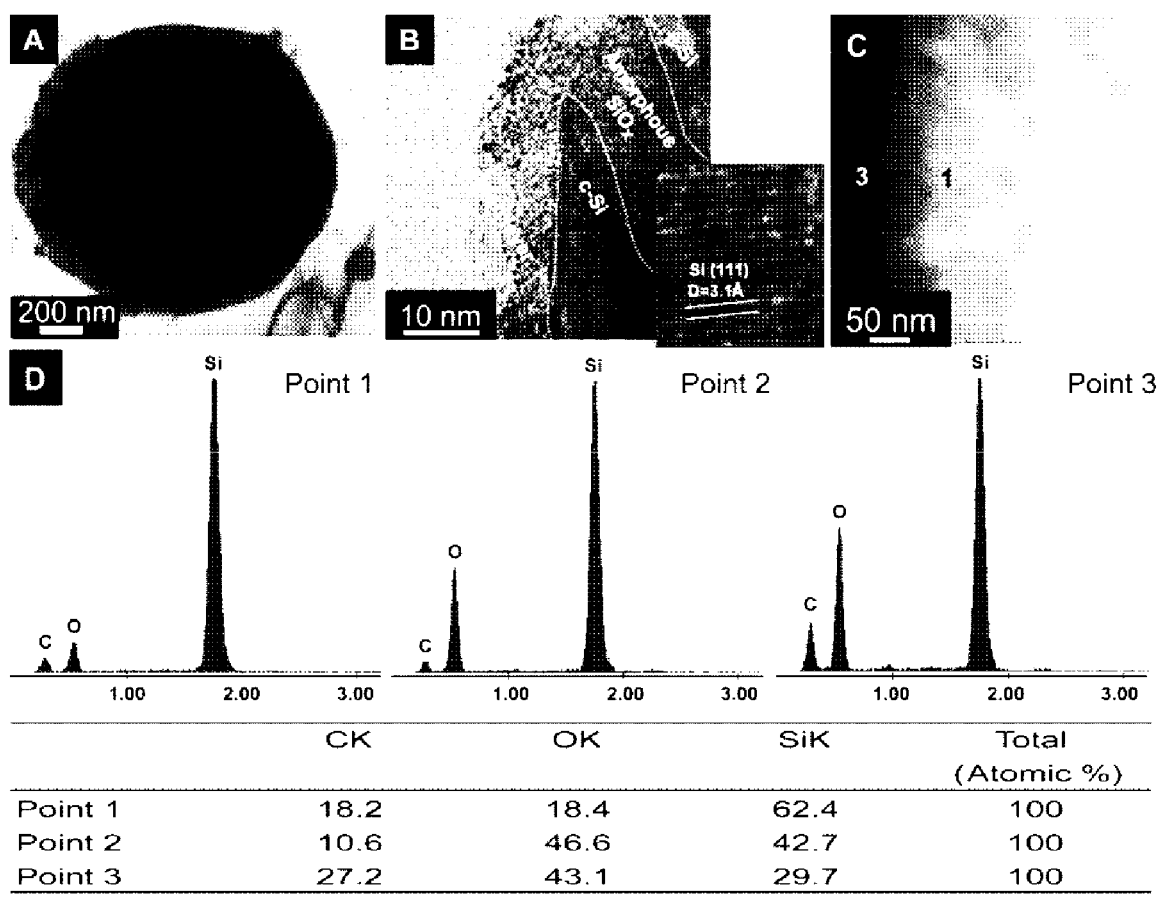
FIG. 4 illustrates transmission electron microscope (TEM) photographic images of a porous silicon-silicon oxide-carbon composite prepared in Example 1.

By using a transmission electron microscope, the picture of the porous silicon-silicon oxide-carbon composite prepared in Example 1 was taken, and the results are shown in FIG. 4. FIG. 4 illustrates images of the porous silicon-silicon oxide-carbon composite on the scale of 200 nm (A) and 10 nm (B), respectively.

A of FIG. 4 illustrates the entire surface of the porous silicon-silicon oxide-carbon composite, and referring to A of FIG. 4, in the porous silicon-silicon oxide-carbon composite prepared in Example 1, minute particles having a size from several nanometers to several tens nanometers are secured to be evenly distributed.

Referring to B of FIG. 4, it is confirmed that etched silicon particles by sodium hydroxide used as a catalyst are positioned in a silicon oxide-carbon structure, and from the photographic image represented by a square box, a region represented by etched silicon particles (c-Si) is filled with silicon particles. In addition, it is confirmed that between the crystalline etched silicon particles, amorphous silicon oxide ($SiO_x$) is positioned, and the outer surface of the silicon oxide ($SiO_x$) is coated with amorphous carbon.

To verify the above-described structure, a STEM image and energy dispersion X-ray spectrum at positions 1, 2, and 3 of the image C, are shown in C and D of FIG. 4.

Referring to C and D of FIG. 4, it is confirmed that nanoparticles of silicon-rich components are distributed in the composite, silicon oxide [$SiO_x$, x≈1] is distributed therebetween, and carbon components are present at the periphery thereof.

Experimental Example 3: Measurement of Carbon Content Via Thermogravimetric Analysis and Experiment on Nitrogen Adsorption Isotherm In A and B of FIG. 5, the thermogravimetric analysis results, nitrogen adsorption isotherm results, and pore size distribution measurement results of the porous silicon-silicon oxide-carbon composite prepared in Example 1 are respectively shown.

Figure 5:
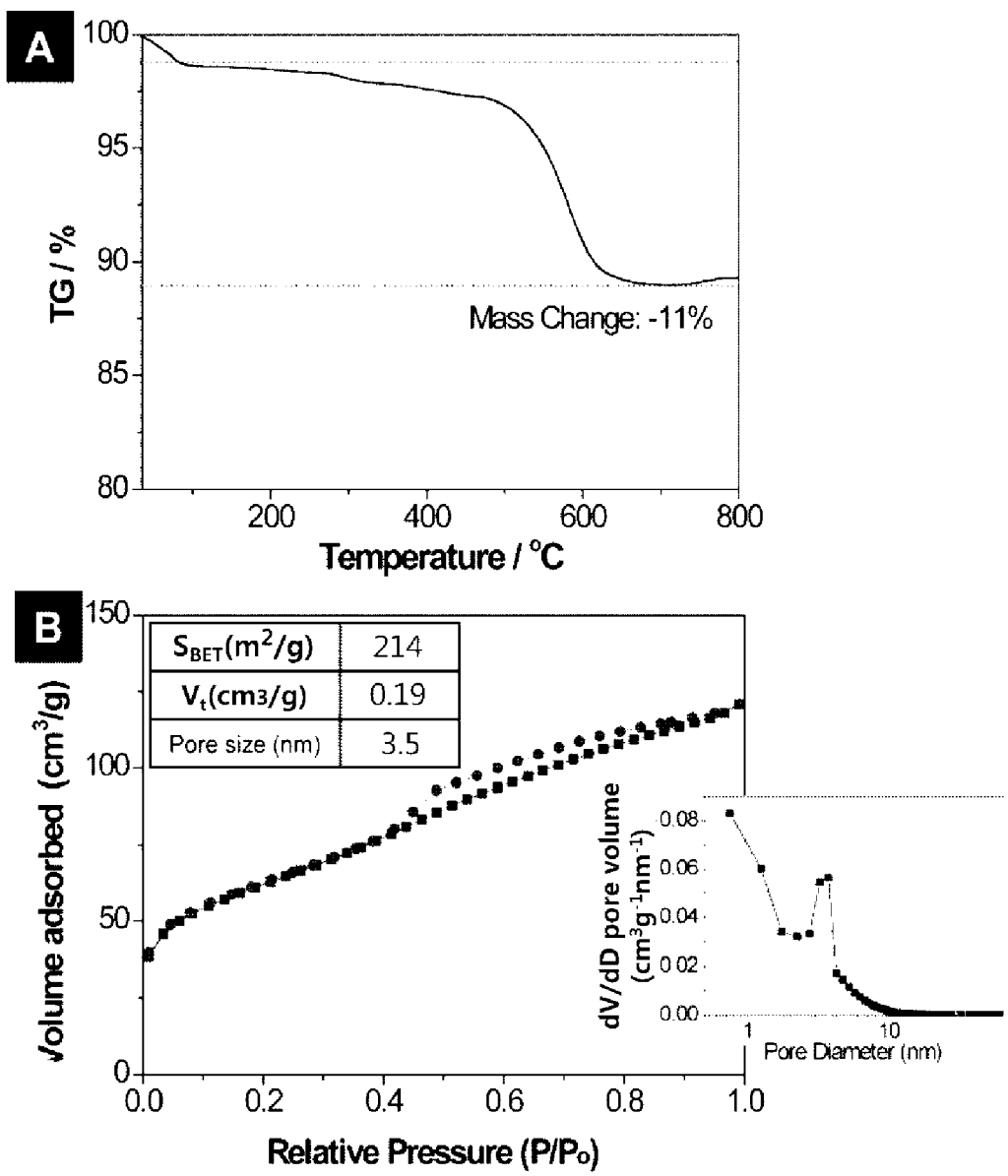
FIG. 5 illustrates graphs on thermogravimetric analysis results (A), on nitrogen adsorption isotherm results and on pore size distribution measurement results (B) of a porous silicon-silicon oxide-carbon composite prepared in Example 1.

Referring to A of FIG. 5, it is confirmed that about 11 wt % of amorphous carbon is present in the porous silicon-silicon oxide-carbon composite prepared in Example 1.

In addition, referring to B of FIG. 5, it is confirmed that the specific surface area of the silicon-silicon oxide-carbon composite prepared in Example 1 is 214 $m^2/g$, the inner region of the composite particles with a size of 1 to 2 μm has a porous structure, and the average pore size of the composite formed by the removal of by-products formed from a catalyst is about 5 nm, when referring to the pore size distribution (graph inserted in FIG. 5B).

Experimental Example 4: Electrochemical Properties

Figure 6:
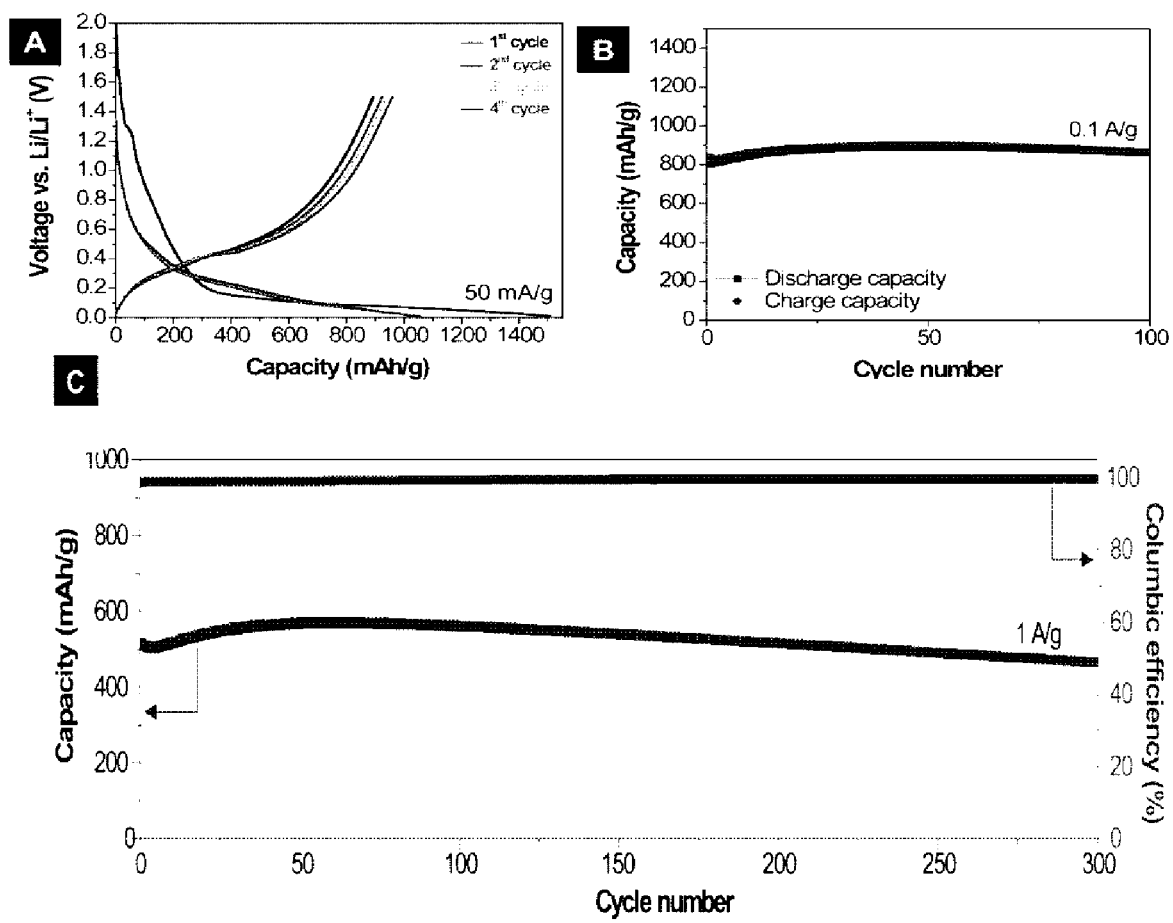
FIG. 6 illustrates graphs on measured results of electrochemical properties on a lithium secondary battery prepared in Example 2, where A of FIG. 6 is a graph illustrating first potential profile in a region of 0.01 to 1.5 V when a charge and discharge ratio is 50 mA/g, B of FIG. 6 is a graph illustrating lithiation-delithiation capacity retention change according to the cycle number of charge and discharge when a charge and discharge ratio is 0.1 A/g, and C of FIG. 6 is a graph illustrating long-term cycling stability and coulombic efficiencies when a charge and discharge ratio is 1 A/g.

The electrochemical properties of the lithium secondary battery prepared in Example 2 were measured and shown in FIG. 6. Particularly, A of FIG. 6 illustrates a graph showing first potential profile in a region of 0.01 to 1.5 V when a charge and discharge ratio was 50 mA/g, B of FIG. 6 illustrates a graph showing lithiation-delithiation capacity retention change according to the charge and discharge cycle number when a charge and discharge ratio was 0.1 A/g, and C of FIG. 6 illustrates a graph showing long-term cycling stability and coulombic efficiencies when a charge and discharge ratio was 1 A/g.

Referring to FIGS. A and B of FIG. 6, irreversible properties appear a lot in an initial first cycle, but after that, the intercalation and deintercalation of lithium and retention capacity are kept constant even with the increase of the cycle number.

In addition, referring to C of FIG. 6, it is confirmed that charge and discharge capacity and coulombic efficiencies are stably kept even when the cycle number increases to 300.

Experimental Example 5: Volume Expansion Properties of Electrode According to Electrochemical Reaction FIG. 7 illustrates a graph on the measurement of the volume change ratios of electrodes after evaluating the electrochemical properties of the lithium secondary batteries prepared in Example 2 and Comparative Example 2, and particularly, the thickness change of the electrodes in coin type cells after 100 cycles in a charge and discharge ratio of 0.1 A/g are measured and illustrated.

Figure 7:
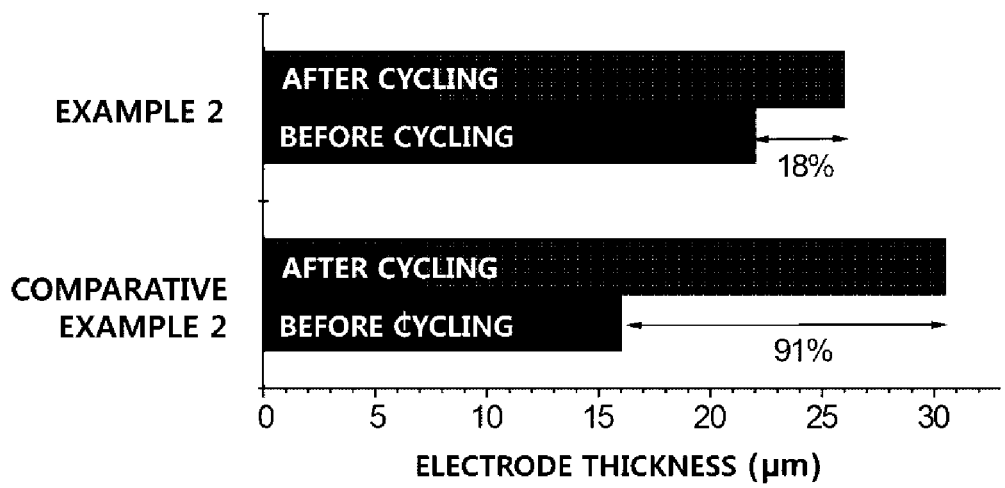
FIG. 7 is a graph on volume change ratios of electrodes after evaluating electrochemical properties on lithium secondary batteries prepared in Example 2 and Comparative Example 2.

Referring to FIG. 7, the lithium secondary battery prepared in Comparative Example 2 shows a large volume change ratio of 91% after 100 cycles of charge and discharge, but the lithium secondary battery of Example 2 according to an embodiment of the present invention shows a relatively small volume increasing ratio even after 100 cycles of charge and discharge.

Experimental Example 6: SEM Photographic Images (Verification of Structural Stability)

Figure 8:
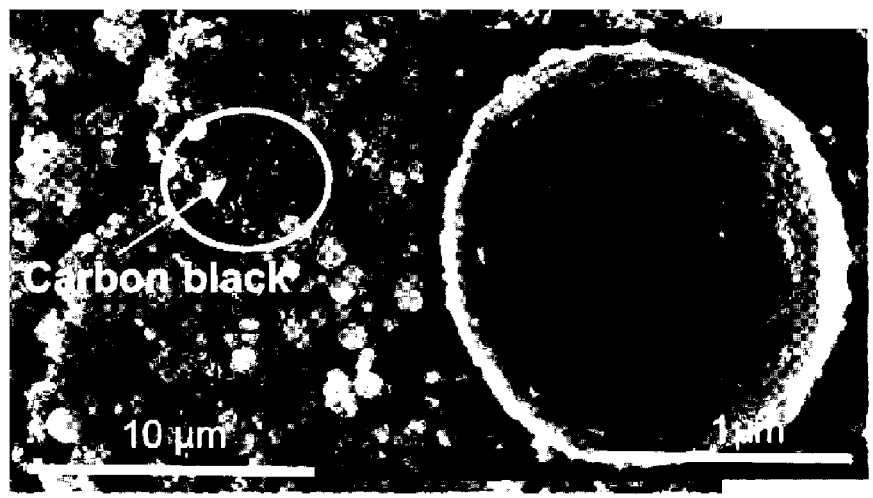
FIG. 8 is a SEM photographic image to secure the structural stability of a silicon-silicon oxide-carbon composite after a long-term cycling stability test on a lithium secondary battery prepared in Example 2.

FIG. 8 illustrates a SEM photographic image to verify the structural stability of a silicon-silicon oxide-carbon composite after testing long-term cycling stability with respect to the lithium secondary battery prepared in Example 2.

Particularly, in FIG. 8, the SEM photographic image of the surface of an electrode after conducting charge and discharge cycle of a lithium secondary battery is illustrated. Referring to FIG. 8, it is confirmed that the shape of the porous carbon-silicon composite is not much changed even after conducting the charge and discharge cycle of the lithium secondary battery. From the results, it is confirmed that the porous silicon-silicon oxide-carbon composite maintained a stable state after conducting the charge and discharge cycle.

The invention claimed is:

1. A porous silicon-silicon oxide-carbon composite, comprising a silicon oxide-carbon structure and silicon particles, wherein
    the silicon oxide-carbon structure comprises a plurality of micropores, and
    the silicon particles are uniformly distributed in the silicon oxide-carbon structure;
    wherein a specific surface area of the porous silicon-silicon oxide-carbon composite is from 150 $m^2/g$ to 250 $m^2/g$, and
    wherein an average diameter ($D_{50}$) of the silicon particles is from 1 nm to 90 nm.

2. The porous silicon-silicon oxide-carbon composite of claim 1, wherein the micropores of the porous silicon-silicon oxide-carbon composite have an average pore size of 0.5 nm to 10 nm.

3. The porous silicon-silicon oxide-carbon composite of claim 1, wherein an average diameter ($D_{50}$) of the porous silicon-silicon oxide-carbon composite is from 0.1 μm to 25 μm.

4. The porous silicon-silicon oxide-carbon composite of claim 1, wherein the silicon oxide-carbon structure is a silicon oxide coated with a carbon coating layer, and the plurality of micropores are formed on the carbon coating layer.

5. A negative electrode active material comprising the porous silicon-silicon oxide-carbon composite according to claim 1.

6. A negative electrode comprising the negative electrode active material according to claim 5.

7. A lithium secondary battery comprising the negative electrode according to claim 6.

8. A method of preparing the porous silicon-silicon oxide-carbon composite of claim 1, comprising:
  (a) a step of preparing a precursor solution comprising a silicon source, a silicon oxide source, a carbon source, and a catalyst material;
  (b) a step of conducting spray pyrolysis of the precursor solution to prepare composite particles in which the silicon particles are uniformly distributed in the silicon oxide-carbon structure; and
  (c) a step of removing by-products generated from the catalyst material in the composite particles thus prepared to form the micropores in the silicon oxide-carbon structure.

9. The method of preparing a porous silicon-silicon oxide-carbon composite of claim 8, wherein the silicon source comprises silicon nanoparticles, and the silicon oxide source is produced by etching the silicon source using the catalyst material.

10. The method of preparing a porous silicon-silicon oxide-carbon composite of claim 8, wherein the catalyst material is used for etching the silicon source and for promoting a carbonizing rate of the carbon source, and the catalyst material is at least one selected from the group consisting of lithium hydroxide (LiOH), sodium hydroxide (NaOH), potassium hydroxide (KOH), rubidium hydroxide (RbOH), cesium hydroxide (CsOH), ammonium hydroxide ($NH_4OH$), calcium hydroxide ($Ca(OH)_2$), and magnesium hydroxide ($Mg(OH)_2$).

11. The method of preparing a porous silicon-silicon oxide-carbon composite of claim 8, wherein in step (a), a concentration of the silicon source is from 0.01 M to 3 M, a concentration of the carbon source is from 0.01 M to 3 M, and a concentration of the catalyst material is from 0.01 mM to 0.1 M, in the precursor solution.

12. The method of preparing a porous silicon-silicon oxide-carbon composite of claim 8, wherein the spray pyrolysis in step (b) comprises spraying the precursor solution to form droplets, and drying and pyrolyzing the droplets.

13. The method of preparing a porous silicon-silicon oxide-carbon composite of claim 12, wherein by the pyrolysis of the droplets, solvents included in the droplets are removed, and the silicon oxide source and the carbon source are pyrolyzed to form the silicon-silicon oxide-carbon composite particles in which the silicon particles are uniformly distributed in the silicon oxide coated with the carbon.

14. The method of preparing a porous silicon-silicon oxide-carbon composite of claim 8, wherein the composite particles prepared in step (b) comprises the silicon particles, silicon oxide, carbon, and the by-products, which are respectively derived from the silicon source, the silicon oxide source, the carbon source and the catalyst material, and the by-products are uniformly distributed in the composite particles.

15. The method of preparing a porous silicon-silicon oxide-carbon composite of claim 8, wherein the spray pyrolysis in step (b) is conducted in a spray pyrolysis apparatus comprising a spraying apparatus, a reactor, and a collecting part, and
  the droplets of the precursor solution are formed by spraying the precursor solution using the spraying apparatus.

16. The method of preparing a porous silicon-silicon oxide-carbon composite of claim 15, wherein the droplets are injected into the reactor in a flow rate of 0.5 L/min to 40 L/min,
  and the droplets injected into the reactor stay in the reactor for from 0.1 to 20 seconds.

17. The method of preparing a porous silicon-silicon oxide-carbon composite of claim 15, wherein spraying is conducted by ultrasonic vibrations having a frequency of 0.1 MHz to 10 MHz.

18. The method of preparing a porous silicon-silicon oxide-carbon composite of claim 15, wherein the droplets have a diameter of 0.5 μm to 100 μm.

19. The method of preparing a porous silicon-silicon oxide-carbon composite of claim 8, wherein the spray pyrolysis comprises a heat treatment process in a temperature range of 200° C. to 1,200° C.

* * * * *